United States Patent [19]
Bellemore

[11] Patent Number: 5,835,686
[45] Date of Patent: *Nov. 10, 1998

[54] ELECTRONIC PREPRESS SYSTEM HAVING A CAPSTAN DRIVEN VIRTUAL INTERNAL DRUM IMAGESETTER

[75] Inventor: Arthur J. Bellemore, Chelmsford, Mass.

[73] Assignee: Agfa Division—Bayer Corporation, Wilmington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 640,048

[22] Filed: Apr. 30, 1996

[51] Int. Cl.⁶ .............................. H04N 1/21; H04N 1/04; G06F 15/00

[52] U.S. Cl. .................. 395/105; 395/115; 395/116; 358/296; 358/298; 358/300; 358/302; 358/491; 358/493; 358/496

[58] Field of Search .................................... 395/105, 115, 395/116; 358/474, 489, 491, 493, 494, 496, 498, 487, 490, 296, 298, 300, 302, 480, 481, 484, 495; 355/47; 347/262, 264

[56] References Cited

U.S. PATENT DOCUMENTS

| | | | |
|---|---|---|---|
| 3,314,074 | 4/1967 | Becker | 347/264 |
| 3,874,621 | 4/1975 | Blair et al. | |
| 4,168,506 | 9/1979 | Corsover | |
| 4,206,482 | 6/1980 | Delavalette et al. | 358/296 |
| 4,468,707 | 8/1984 | Kuehnle et al. | 358/498 |
| 4,595,957 | 6/1986 | Holthusen | |
| 4,686,540 | 8/1987 | Leslie et al. | 347/264 |
| 4,686,541 | 8/1987 | Rosier | 347/262 |
| 4,864,411 | 9/1989 | Hale et al. | 358/498 |
| 5,095,320 | 3/1992 | Rose | 347/262 |
| 5,508,730 | 4/1996 | Klein | |
| 5,671,005 | 9/1997 | McNay et al. | |

*Primary Examiner*—Edward L. Coles
*Assistant Examiner*—Mark Wallerson
*Attorney, Agent, or Firm*—John A. Merecki

[57] ABSTRACT

A method and apparatus for an electronic prepress system includes a computer workstation for preparing electronic image files. The computer workstation transfers the image files to an image processor that converts the image files into digital data. The digital data is then transferred to a virtual-drum capstan-driven output device for outputting the image files onto paper, film or plate material. The output device has increased output speed and reduced cost compared to an internal drum device. A capstan drive moves web type image recording media through a curved media platen having an upper curved surface and a lower curved surface which form the media into a virtual drum. The optical system has a rotating reflective spinner at the center of curvature of the virtual drum to scan modulated image date across media while being continuously driven. A tensioning mechanism maintains the media in a taught configuration and works in cooperation with the capstan drive to accurately control the motion of the media during imaging.

17 Claims, 3 Drawing Sheets

ELECTRONIC PREPRESS SYSTEM HAVING A CAPSTAN DRIVEN VIRTUAL INTERNAL DRUM IMAGESETTER

BACKGROUND OF THE INVENTION

There are several types of electronic pre-press devices used in the graphic arts industry for outputting images from electronic files onto film, paper, plate material, or other image recording media. Imagesetting and platesetting devices are available in flatbed, internal drum, external drum, and capstan-type engine configurations. Each configuration offers varying features and benefits, depending on the demands of the user. The user's demands, such as image quality and resolution, printing run length, and work flow volume or output speed can determine the best configuration for the job. For example, in a capstan system the recording media is in a web form and has a continuous motion through the device so that imaging occurs without delays for media loading and unloading. In an internal drum system, an advantage is realized because of the symmetry of the internal drum, in a relatively simple and inexpensive optical system compared to an optical system in a capstan system. Typical capstan systems require an expensive F-theta lens to a allow the scanned beam to be focused across the flat scan line.

Further, disadvantages may be associated with each type of output device. For example, a large and expensive drum for an internal drum system is cast of aluminum and requires precision machining on the drum surface. Some internal and external drum systems require expensive vacuum systems to keep the media stationary against the drum during imaging. Delays in imaging can occur frequently due to loading and unloading sheet form recording media. Also, the floor space generally required by an internal drum imagesetter is large.

Given the above described features of the prior art devices and some of the problems encountered therewith, it is a general object of the invention to provide an improved system and inexpensive imaging device for outputting images from electronic files onto film, paper, plate material, or other image recording media.

It is an object of the present invention to increase the relative work flow volume or speed desired for outputting images as compared to conventional output devices.

It is an object of the invention to use a simple optical system as in an internal drum type output device, for example to eliminate the use of an F-theta lens.

It is a specific object of the invention to incorporate the advantages of an internal drum type imaging system with the advantage of a capstan type imaging system having a continuous motion of the image recording media.

It is a specific object of the invention to eliminate the need for a large and expensive internal drum as can be typical for internal drum output devices by urging the image recording media into the shape of an internal drum forming a virtual drum.

It is an object of the invention to reduce the floor space required by the imaging system, by eliminating a large and spacious internal drum as known in the prior art.

SUMMARY OF THE INVENTION

A method and apparatus for an electronic prepress system comprises a computer workstation for creating, previewing, storing and transferring electronic image files to be outputted onto recording media. The workstation controls other components of the electronic prepress system, which can include an image processor for converting the electronic image files transferred from the computer workstation into digital data files. An output device for outputting the digital data files onto recording media in a form of images previewed on said computer means comprises a media transport mechanism for transporting recording media along a media path, a curved support for supporting the media and forming the media into a virtual drum having an axis parallel to the media path, and a scanning apparatus for scanning a modulated recording beam representing the digital data files across the virtual drum in a scan line. The media transport means transports the media relative to the curved support during scanning by the scanning apparatus to form a series of adjacent scan lines.

BRIEF DESCRIPTION OF THE DRAWINGS

The objects and features of the invention will be better understood and further objects and advantageous of the invention will become apparent in the following detailed description of the invention, when taken with the accompanying drawing(s), in which.

DETAILED DESCRIPTION OF THE INVENTION

Figure 1:
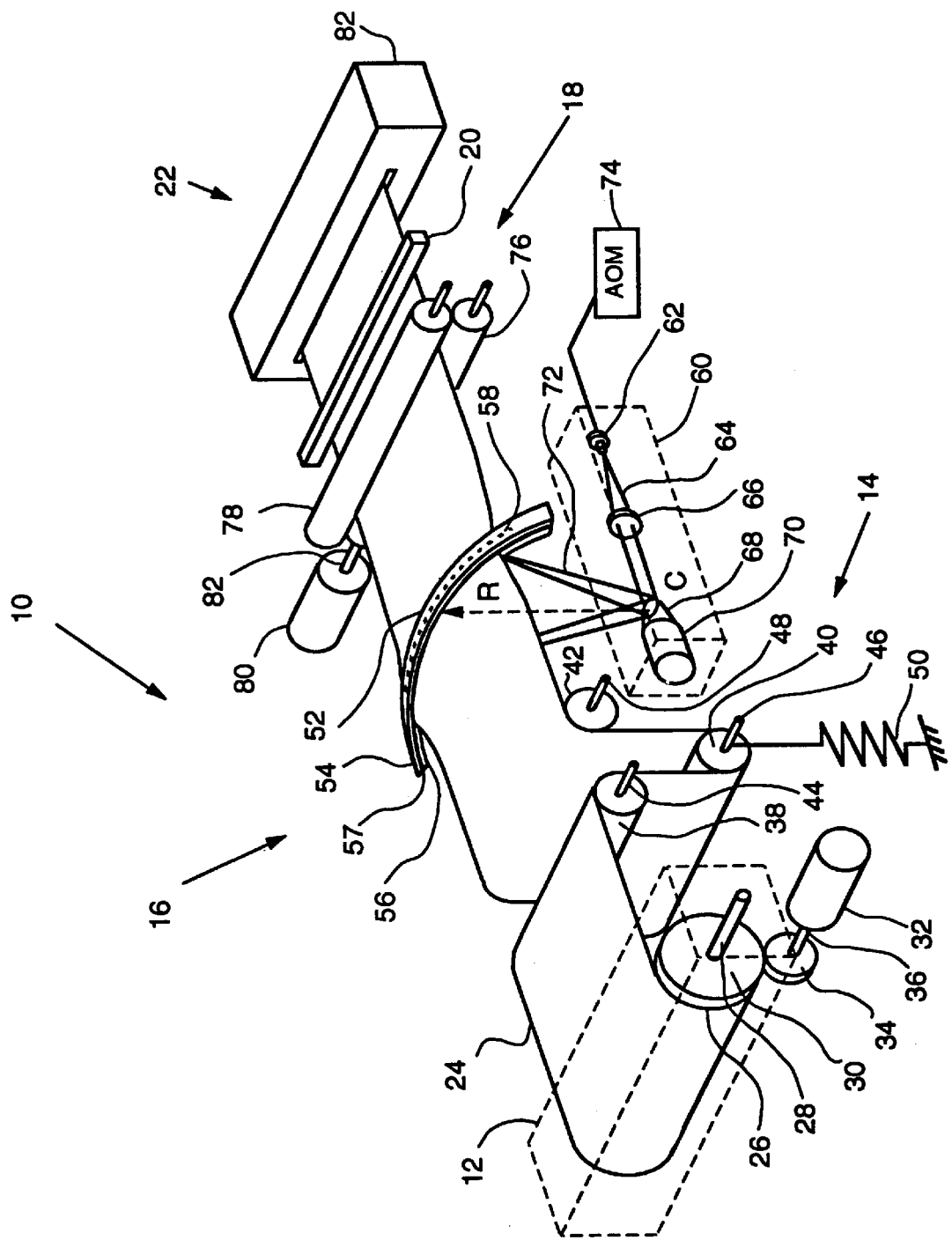
FIG. 1 is a preferred embodiment of a virtual drum, capstan driven imaging device according to the present invention.

Referring to the FIG. 1, a capstan driven virtual internal drum imaging system is shown, generally indicated as 10, according to the present invention. The imaging system 10 has a media supply station 12, a media tensioning station 14, an imaging station 16, a capstan drive 18, a media cutter 20, and a media take-up station 22. Web type image recording media 24 is used in the imaging system 10 and can be paper, film, or plate type material.

The media supply station 12 contains a supply roll of the media 24 which is supported on a roll shaft 28 which has a drive gear 30 on the outer end of the shaft 28. The drive gear 30 is driven by a motor 32 which rotates the drive gear 30 through a motor gear 34 connected to the motor shaft 36. The media 24 is fed through the tensioning station 14 which includes a series of rollers 38, 40, 42, which rotate freely about their respective roller shafts 44, 46, 48. A tensioning spring 50 is connected to the shaft 46 of roller 40. Roller 40 is vertically adjustable relative to the other rollers 38, 42 and relative to a support frame (not shown) to accommodate and control slack or tension in the media 24. The tensioning station 14 works in cooperation with the drive motor 32 during start and stop sequences to control the media and absorb torque disturbances. The spring has a tension measuring gauge to measure the tension or slack in the media. The gauge provides feedback to the media supply drive motor 32 to control the output torque of the drive motor 32 according to the amount of tension in the media.

The imaging station 16 includes a curved media platen 52 which has an upper surface 54 and a lower surface 56 between which the media 24 passes. A space 57 is provided between the upper and lower surfaces 54, 56 for the media 24, the space being a few mils thicker than the thickness of the media 24. The curved media platen 52 can be provided with a mechanism to adjust the space 57 between the upper and lower surfaces 54, 56, such as with a precision screw and nut assembly on the outer ends of the platen (not shown), to accommodate varying thicknesses of media 24. The lower surface 56 is provided with a slot 58 through which the media 24 is imaged. In the vicinity of the slot 58 the media 24 is curved by the platen 52 creating a radius of curvature R in the media with a center of curvature C to form a virtual drum for optimal imaging according to the present invention. In FIG. 1 the curved media platen 52 is shown having a relatively narrow width in the preferred embodiment of the invention. However, it will be appreciated that the width of the platen 52 in the direction of the media motion can be larger, and that the curvature of the media platen need not be uniform over the width of the platen. The platen can have a very large radius of curvature at the entrance and exit of the media plate so as to be flat at the entrance and exit, and to have a relatively small radius of curvature at the center of the media plate at the area of the media plate to form the virtual drum in the media where the media is imaged, and having smooth transitional areas between the entrance, center, and exit of the media platen to allow smooth passing of the media through the platen without rippling of the media. Alternatively several narrow media platens may be spaced apart along the media path. In all these variations the virtual drum is formed in the media.

A laser scanning system 60 is positioned below the curved media platen 52. A laser source 62 generates a beam 64 which is focused by an optical element 66 onto a reflective spinner 68. The spinner 68 is rotated by spin motor 70 to scan the reflected beam 72 across the virtual drum of the media 24 through slot 58 of the lower surface 56 of the media platen 52 in a scanline. The center of curvature C of the virtual drum is the same point that the beam 64 encounters the reflective spinner 68. The distance the beam travels from the spinner to the media at the slot is uniform during rotation of the spinner through an angle during which the beam scans the media The beam spot focus remains uniform as a result. The laser source 62 is modulated on and off by an acoustic-optical modulator 74, hereinafter AOM. Alternatively, it will be understood by those skilled in the art that the AOM can be replaced by modulation of a laser diode. The media motion is continuous during beam scanning to write successive lines of half-tone dots onto the media to form a continuous image.

Motion of the media is primarily controlled by the capstan drive 18. The capstan drive 18 has a pair of nip rollers 76, 78 which are driven by drive motor 80. The nip rollers are pinched together in rolling contact so that motion is transmitted from the driven roller 76 to the other roller 78 upon its rotation. The capstan drive 18 accurately controls the media motion to synchronize the advancement of the media 24 though the imaging station 16 with the laser scanning system 60 in the following manner.

Figure 2:
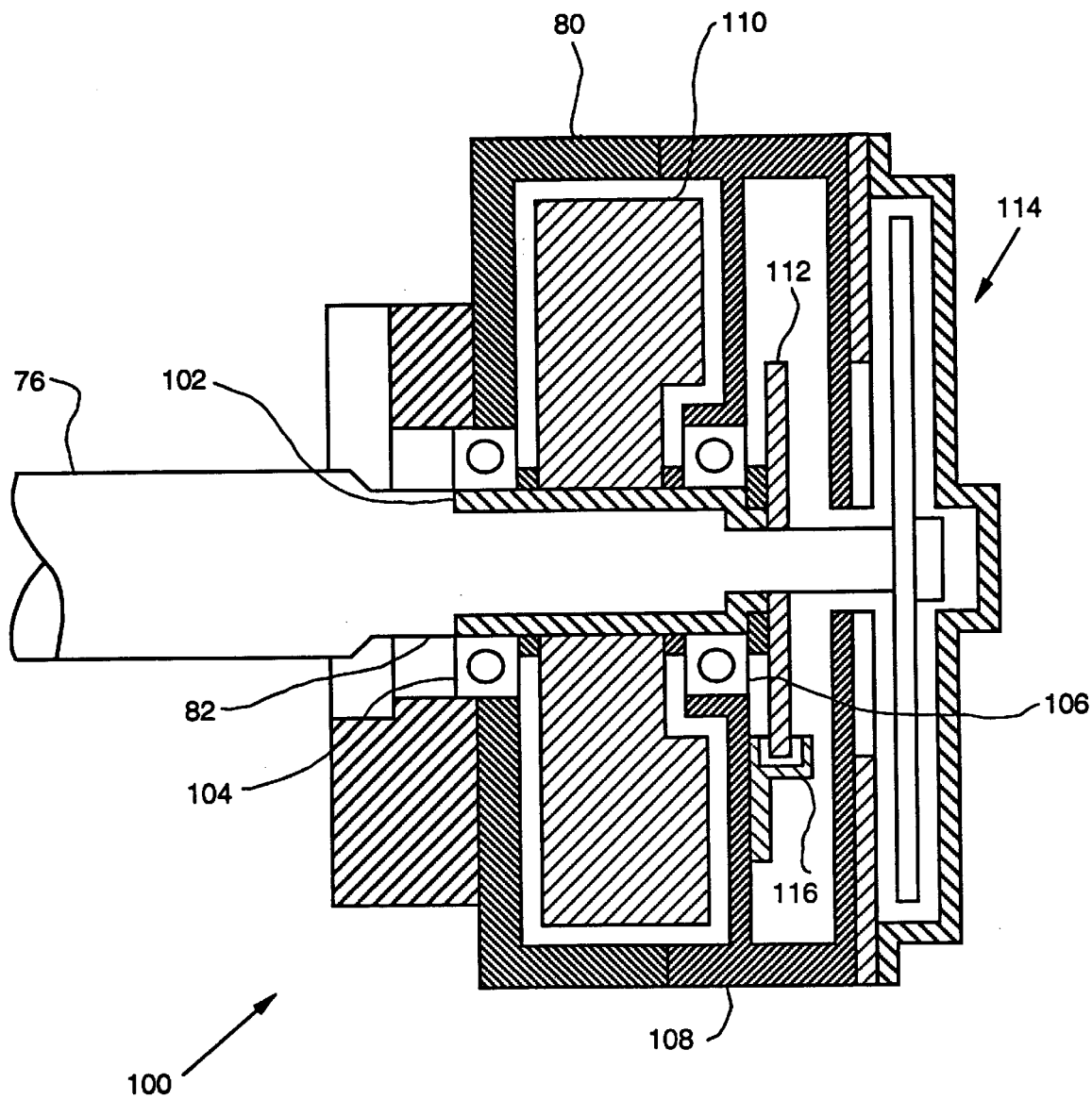
FIG. 2 is a sectional view of an assembled integrated rotary drive apparatus as a preferred embodiment for a drive motor and roller shaft connection in a capstan drive of the capstan driven imaging device according to the present invention.

Referring to FIG. 2, an integrated rotary drive apparatus 100 is shown as the preferred embodiment for a connection between the drive motor 80 and nip roller shaft 82 of the capstan drive 18. The integrated rotary drive apparatus 100 has a closed loop electronic feedback controller which varies the torque output from the motor 80 for the purpose of rotating the nip roller 76 in a controlled manner. As can be seen in FIG. 2, the nip roller shaft 82 is supported within a hollow shaft 102 of the motor 80 supported by bearings 104, 106. The bearings are contained within a motor case 108. Mounted on the hollow shaft 102 are an inertia flywheel 110 and a rotary optical encoder disk 112 which rotate with the hollow shaft 102 and with the nip roller shaft 82. The roller shaft 82 is mechanically coupled to the hollow shaft 102 as well as to the motor armature assembly, generally shown as 114. An optical encoder reader 116 is also contained and fixed within the casing 108. The optical encoder disk 112 when aligned with encoder reader 116 provides electrical feedback to a closed loop electronic control system. The feedback comprises an electronic signal representative of the angular position and velocity of hollow shaft 200. The feedback signal is used to control the output torque of the DC motor 80 to provide motion control of the nip roller 76. Additional details of the integrated rotary drive apparatus are provided in U.S. Pat. No. 5,450,770, which is hereby incorporated by reference.

The tensioning station 14 and the capstan drive 18 are important to the invention to keep the media 24 taught during media motion through the curved media platen 52. The tensioning system 14 provides a force pulling the media tight in the reverse direction of the media motion, to the left as viewed in FIG. 1, while the capstan drive motor 80 and nip rollers 76, 78 provide a force pulling the media to the right as viewed in FIG. 1. This allows for the media 24 to smoothly transition from a flat profile at the rollers 42 and 76, 78, to the curved profile in the media platen 52 with a radius of curvature R, without rippling of the media in the areas between the rollers and the platen 52.

Figure 3:
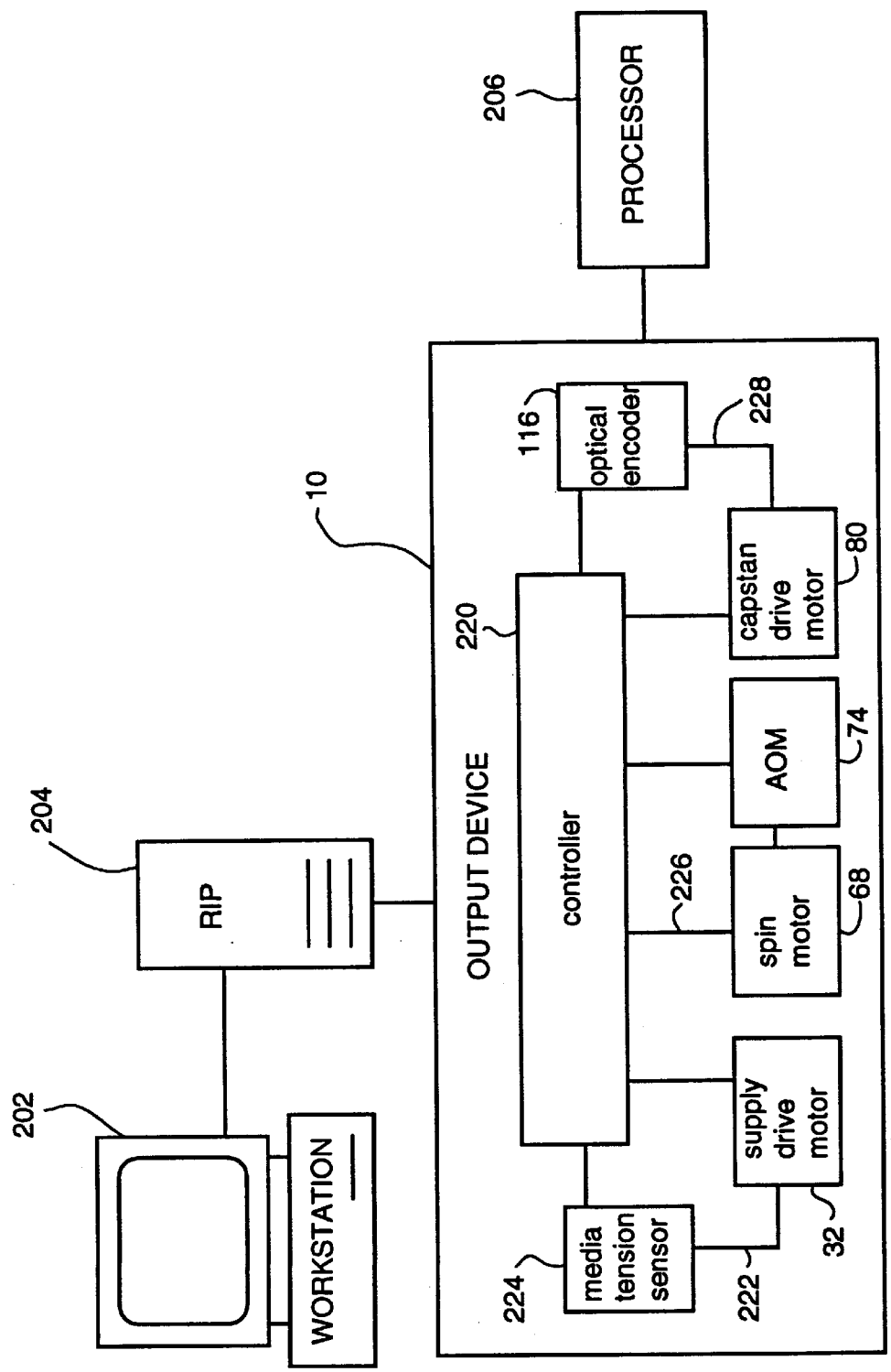
FIG. 3 is an illustrative view of an electronic prepress system including a workstation, a RIP, a capstan driven imaging output device according to the present invention, and an on-line processor.

Referring to FIG. 3, an electronic prepress system 200 is depicted showing the output device 10 according to the present invention in connection with a workstation 202, a raster image processor (RIP) 204, and an on-line processor 206. The workstation 202 is used to create, store, preview and transfer electronic files of images, and to control other components of the electronic prepress system 200. The workstation transfers the electronic files to the RIP 204 for digitizing, i.e. converting the electronic files into digital images which can be understood by the output device 10 and sent through the AOM 74 for output. The output device 10 has a controller 220 which controls the commands and signals to the supply drive motor 32, the spin motor 68, and the capstan drive motor 80. A feedback loop 222 is shown from the media tension sensor 224 to the controller 220 which provides feedback to the supply drive motor 32 to control the output torque of the drive motor 32 according to the amount of tension in the media. The controller 220 synchronizes the control of the spin motor 68 and the AOM 74, as indicated by loop 226. Additionally, the closed loop electronic control system 228 is shown for the integrated rotary drive apparatus 100, as previously described, wherein the optical encoder 116 provides feedback to the controller 220 to control the output torque of the capstan drive motor 80. Information is exchanged between the RIP 204 and the output device 10, as well as between the output device 10 and the processor 206.

Returning to FIG. 1, after passing through the capstan drive 18, the media 24 is moved past the media cutter 20 and into the take-up station 22. A take-up cassette 82 collects the media 24. The media cutter can be selectively activated by an operator or it can be controlled by the output device controller 220, to cut the media between jobs or accumulate successive jobs and cut when the cassette is full. Alternatively, the take-up station may comprise an on-line processing device 206, as depicted in FIG. 3, when the media outputted from the present invention requires additional processing, whether it be chemical "wet" processing or mechanical "dry" type processing.

The preferred embodiment of the curved media platen described with reference to FIG. 1 curves the media into a partial cylinder having a uniform radius of curvature. However, it will be understood by those skilled in the art that the configuration of the media platen may be other than that described herein and the optical system may be designed to accommodate such other configurations to obtain accurate and focused imaging on the media.

While this invention has been described in terms of various preferred embodiments, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What is claimed is:

1. An electronic prepress system comprising:
    (a) a computer for creating, previewing, storing and transferring electronic image files to be outputted onto recording media, and for controlling other components of the electronic prepress system;
    (b) an image processor for converting the electronic image files transferred from said computer into digital data files;
    (c) an output system for outputting said digital data files onto recording media in a form of images previewed on said computer, said output system comprising a media transport system for transporting recording media along a media path, a curved support for supporting the media and forming the media into a virtual drum such that the media is curved in a direction which is substantially perpendicular to the media path, and a scanning system for scanning a modulated recording beam representing said digital data files across said virtual drum in a scan line, said media transport system transporting the media along the media path relative to said curved support during scanning by said scanning system to form a series of adjacent scan lines;
    wherein said curved support is configured to only curve the recording media immediately adjacent said scan line, the recording media remaining in a substantially flat configuration on opposing sides of said curved support.

2. The system according to claim 1, further comprising a processing system for processing said recording media outputted by said output system.

3. A method for an electronic prepress system, comprising the steps of:
    (a) creating, previewing, storing and transferring electronic image files on a computer workstation, the image files to be outputted onto recording media;
    (b) controlling other components of the electronic prepress system from the computer workstation;
    (c) converting the electronic image files transferred from said computer workstation into digital data files with an image processing device;
    (d) outputting the digital data files onto recording media in a form of images previewed on the computer workstation with an output device, the output device performing the steps of transporting recording media along a media path, supporting the media in a curved form at an imaging station on the media path and forming the media into a virtual drum such that the media is curved in a direction which is substantially perpendicular to the media path, and scanning a modulated recording beam representing the digital data files across the virtual drum in a scan line while transporting the media along the media path relative to the imaging station to form a series of adjacent scan lines;
    wherein the recording media is only curved immediately adjacent said scan line, the recording media remaining in a substantially flat configuration on opposing sides of said scan line.

4. The method according to claim 3, further comprising the step of processing the recording media outputted from the output device by means of a media processing device.

5. The system according to claim 1, wherein said curved support curves the media in an arc having a constant radius of curvature.

6. The system according to claim 5, wherein said scanning system includes a rotating reflective element which projects said recording beam onto said media in said scan line, said rotating reflective surface being at a center of the radius of curvature of said arc.

7. The system according to claim 1, wherein said curved support includes a curved media platen having an upper curved surface, a lower curved surface, and a space between said upper curved surface and said lower curved surface, said media passing through said space as it is transported along said media path by said media transport system.

8. The system according to claim 7, wherein the lower surface of said curved media platen includes a slot through which the media is imaged by the recording beam of said scanning system.

9. An imaging system comprising:
    (a) a processing system for generating an image file;
    (b) an output system for outputting the image file onto recording media, the output system comprising a media transport system for transporting the recording media along a media path, a curved support for curving and supporting the recording media in a direction which is substantially perpendicular to the media path, and a scanning system for scanning a recording beam representing the image file across the curved recording media in a scan line, the media transport system transporting the recording media along the media path relative to the curved support during scanning by the scanning system to form a series of adjacent scan lines;
    wherein the curved support is configured to only curve the recording media immediately adjacent the scan line, the recording media remaining in a substantially flat configuration on opposing sides of the curved support.

10. The imaging system according to claim 9, wherein the recording media is a web-type recording media.

11. The imaging system according to claim 9, wherein the curved support curves the recording media in an arc having a constant radius of curvature.

12. The imaging system according to claim 11, wherein the scanning system includes a rotating reflective element which projects the recording beam onto the media in the scan line, the rotating reflective surface being at a center of the radius of curvature of the arc.

13. The imaging system according to claim 9 wherein the curved support includes a curved media platen having an upper curved surface, a lower curved surface, and a space between the upper curved surface and the lower curved surface, the recording media passing through the space as it is transported along the media path by the media transport system.

14. The imaging system according to claim 13, wherein the lower curved surface of the curved media platen includes a slot through which the recording media is imaged by the recording beam of the scanning system.

15. The imaging system according to claim 13, further including:
   a system for adjusting the space between the upper curved surface and the lower curved surface of the curved media platen to accommodate recording media of varying thicknesses.

16. The imaging system according to claim 13, further including:
   a tensioning system for tensioning the recording media as the media transport system transports the recording media through the space between the upper curved surface and the lower curved surface of the curved media platen.

17. The imaging system according to claim 16, further including:
   a controller for controlling the tensioning system, in response to feedback from the media transport system and the tensioning system, to maintain a predetermined tension in the recording media.

* * * * *